(12) United States Patent
Rizzi

(10) Patent No.: US 11,684,902 B2
(45) Date of Patent: Jun. 27, 2023

(54) REACTOR WITH A CATALYTIC BED

(71) Applicant: CASALE SA, Lugano (CH)

(72) Inventor: Enrico Rizzi, Casnate con Bernate (IT)

(73) Assignee: CASALE SA, Lugano (CH)

( * ) Notice: Subject to any disclaimer, the term of this patent is extended or adjusted under 35 U.S.C. 154(b) by 0 days.

(21) Appl. No.: 16/612,941

(22) PCT Filed: May 23, 2018

(86) PCT No.: PCT/EP2018/063478
§ 371 (c)(1),
(2) Date: Nov. 12, 2019

(87) PCT Pub. No.: WO2018/219731
PCT Pub. Date: Dec. 6, 2018

(65) Prior Publication Data
US 2020/0164329 A1 May 28, 2020

(30) Foreign Application Priority Data
Jun. 2, 2017 (EP) ..................................... 17174266

(51) Int. Cl.
*B01J 8/02* (2006.01)
*B01J 8/04* (2006.01)
*C01C 1/04* (2006.01)

(52) U.S. Cl.
CPC ........... *B01J 8/0214* (2013.01); *B01J 8/0411* (2013.01); *C01C 1/0417* (2013.01);
(Continued)

(58) Field of Classification Search
CPC ..... B01J 8/00; B01J 8/02; B01J 8/0207; B01J 8/0214; B01J 8/04; B01J 8/0411; B01J 2208/00; B01J 2208/00743; B01J 2208/00752; B01J 2208/00796; B01J 2208/00805; B01J 2208/00814; B01J 2208/02; B01J 2208/023; B01J 2208/024;
(Continued)

(56) References Cited

U.S. PATENT DOCUMENTS

| 5,192,512 A | 3/1993 | Quang et al. |
| 6,982,067 B2 * | 1/2006 | Ward .................... B01J 8/0085 422/216 |
| 2002/0065443 A1 | 5/2002 | Williams et al. |

FOREIGN PATENT DOCUMENTS

| CN | 102091570 B | 12/2014 |
| DE | 69504179 T3 | 5/1999 |

(Continued)

OTHER PUBLICATIONS

International Preliminary Report on Patentability from International Application No. PCT/EP2018/063478 completed Sep. 20, 2019.
(Continued)

*Primary Examiner* — Natasha E Young
(74) *Attorney, Agent, or Firm* — Dorsey & Whitney LLP

(57) ABSTRACT

A catalytic bed for a chemical reactor, said catalytic bed having an annular-cylindrical geometry and comprising at least one collector made with a gas-permeable cylindrical wall, containing at least a first catalyst and a second catalyst, wherein the second catalyst has a finer particle size than the first catalyst, and wherein the first catalyst forms a layer of catalyst adjacent to and in contact with said collector.

26 Claims, 2 Drawing Sheets

(52) U.S. Cl.
CPC .......... *B01J 2208/00752* (2013.01); *B01J 2208/00814* (2013.01); *B01J 2208/025* (2013.01)

(58) Field of Classification Search
CPC ........ B01J 2208/025; C01C 1/00; C01C 1/02; C01C 1/04; C01C 1/0405; C01C 1/0417
See application file for complete search history.

(56) References Cited

FOREIGN PATENT DOCUMENTS

| | | |
|---|---|---|
| EP | 2014356 A1 | 1/2009 |
| WO | 9920384 A1 | 4/1999 |
| WO | 0123080 A1 | 4/2001 |

OTHER PUBLICATIONS

International Search Report from International Application No. PCT/EP2018/063478 dated Jul. 4, 2018.
Wiley-VCH Verlag GmbH& Co., Ammonia,Maz App Fed. Rep. of Germany Dannstadt-Schauernheim; XP002529397; 2006, 3 pages.

* cited by examiner

REACTOR WITH A CATALYTIC BED

This application is a national stage application claiming priority to PCT/EP2018/063478, now WO2018/219731, filed on May 23, 2018, which claims priority to European Patent Application Serial No. EP17174266.1, filed on Jun. 2, 2017.

FIELD OF APPLICATION

The invention relates to the field of chemical reactors including a catalytic bed for conversion of a gaseous flow including one or more reagents into a gaseous flow including one or more reaction products.

PRIOR ART

A catalytic bed of a known chemical reactor is bounded by a bottom, two concentric cylindrical walls and a cover.

In a catalytic bed with radial or axial-radial flow, the walls which bound the catalytic bed in a radial direction are named collectors. Said collectors, which have an essentially cylindrical form, must be permeable to the gaseous flow and able to retain the catalyst. Reactors of this type are widely used, for example for the synthesis of ammonia.

The collectors are a critical component for various reasons: they are subject to a relevant stress due to: the thrust of the gas, the action of the catalyst, forces caused by different thermal expansion, erosion caused by possible fluidization of the catalyst, degradation caused by metallurgical reactions. For example the collectors of ammonia reactors are subject to nitriding.

A damage of the collectors with loss of catalyst, even of low entity, lead to rapid degradation of the reactor and result in the need for costly operations of repairing or replacing the internals. It may be stated that proper operation and reliability of a catalytic chemical reactor is mainly dependent on the design and the integrity of said collectors.

The collectors are generally made with perforated walls. For example walls provided with suitable slotted openings are described in EP 2 014 356.

The openings must create a sufficiently large cross-section for the gas passage; at the same time the openings must be significantly smaller than the particles of catalyst, to be able to mechanically and structurally retain the catalytic bed.

It has been noted that catalysts with a fine particle size are advantageous for the purposes of the process. For a given volume available to the catalytic bed, a fine catalyst gives a more intimate and more uniform contact with the reagents and improves the conversion yield.

The retention of a catalyst with a fine particle size, however, is problematic; the perforated walls of the known type are difficult to scale down, reducing the size of the openings, for several reasons.

A first reason is that smaller openings are more subject to the risk of clogging up by catalyst powder. Clogging increases the head loss, affects the performance, increases the thrust on the mechanical components with the risk of failure. A second reason is that, for a given gas passage cross-section, small openings must be more numerous and closer one to each other, making the perforated wall structurally weaker and more vulnerable to metallurgical reactions (for example nitriding) where present. Since the walls are generally relatively thin components, weakening the wall also increases the risk of failure for vertical instability.

For these reasons, the use of a particularly fine catalyst is considered to be problematic in combination with collectors having perforated walls.

SUMMARY OF THE INVENTION

The invention aims to overcome the shortcomings of the prior art and to allow the use of a catalyst with a particularly fine particle size in a catalytic chemical reactor, without adversely affecting the function and the reliability of the collectors of the catalytic bed.

The aims are achieved with:

a catalytic reactor comprising a catalytic bed, suitable for a chemical reaction of conversion of a gaseous charge into a gaseous product, said catalytic bed having an annular-cylindrical geometry, and the reactor comprising at least one collector of the catalytic bed made with a gas-permeable cylindrical wall, characterized in that it comprises at least one annular layer of a first granular material, which is a catalyst adapted to catalyse said reaction of conversion, and at least one annular layer of a second granular material, wherein the second granular material is coarser than the first granular material, the second granular material having a larger particle size than the first granular material, and wherein said layer of second granular material is adjacent to and in contact with said at least one collector, so that said layer of first granular material is separated from the collector by the layer of second granular material.

The at least one collector may be part of the catalytic bed. In some embodiments the at least one collector is part of a cartridge comprising the catalytic bed.

The reactor has preferably a radial or axial-radial flow. The term axial-radial flow denotes that a portion of the catalytic bed is traversed by a flow with a radial and axial component, while another portion is traversed by a flow which is predominantly radial.

For example in an embodiment of an axial-radial flow reactor, a first part of the input flow enters the catalytic bed axially and from top of the catalytic bed, a remaining second part of the input flow enters the catalytic bed radially, and the output flow is radial. Accordingly the flow through the catalytic bed is axial-radial in the upper part of the catalytic bed and is radial or predominantly radial in the middle part and lower part.

Preferably said at least one collector includes an inner collector. More preferably, said at least one collector includes an inner collector in a reactor with inward radial flow. In an embodiment, said reactor has an inward radial flow and comprises two coaxial walls forming an inner collector and an outer collector, and a layer of said second granular material is provided at least around, and in contact with, the inner collector.

Advantageously, the reactor comprises two coaxial gas-permeable walls. Said walls define respectively an inner containing wall and an outer containing wall. One of said containing walls acts as distributor for the gas entering the catalytic bed and the other one of said containing walls acts as collector for the gaseous products exiting the catalytic bed. Said two coaxial containing walls are also named outer collector and inner collector, respectively.

In a preferred embodiment, a reactor of the invention includes a first layer of the second granular material in contact with the inner collector and a second layer of said second granular material in contact with the outer collector. The first granular material forms preferably a central catalytic layer.

The second granular material is generally an amount significantly smaller than the first material, and may be inert to the conversion. However it is preferred that also the second granular material is a catalyst adapted to catalyse said reaction of conversion. Accordingly, the one or more layer(s) of the second granular material are catalyst layers and take part to the conversion.

Preferably, the first granular material and the second granular material are catalysts of the same kind and differ only in terms of particle size.

In a preferred application of the invention, the first granular material is a catalyst suitable for the synthesis of ammonia from a make-up gas containing nitrogen and hydrogen (ammonia catalyst). Also the second granular material may be a catalyst of the same kind.

Catalysts for the synthesis of ammonia from a make-up gas containing nitrogen and hydrogen are known to a skilled person. Various catalysts for this purpose are available, including e.g. iron catalysts and ruthenium catalysts. An overview of catalysts for the synthesis of ammonia can be found in the relevant literature, e.g. Max Appl, "Ammonia", Ullmann's encyclopedia of industrial chemistry, 2006 Wiley-VCH Verlag.

In preferred embodiments, the particle size of the granular materials is such that an average size of the particles of the first material ranges from 10% to 80% of the average size of the particles of the second material. Said size is for example the diameter of spherical or essentially spherical particles.

Advantageously the second material has a particle size from 1.5 mm to 3 mm, for example from 2 mm to 3 mm. The first material has preferably a particle size from 0.5 mm to 2 mm, more preferably from 0.5 mm to 1.5 mm and even more preferably from 0.5 mm to 1 mm. Said dimensions are preferred in particular for ammonia catalyst.

The term "particle size" refers to an average characteristic dimension of the particles of granular material. Said characteristic dimension is, for example, the diameter of spherical particles or, more in general in the case of non-spherical particles, of particles with equivalent dimensions determined for example by means of a screening process.

The size of the particles of granular material generally has a certain statistical distribution, for example a normal distribution (Gaussian curve). For example, the term "particle size of 2 to 3 mm" denotes that said average size ranges from 2 to 3 mm.

In a preferred embodiment, the outer collector and the inner collector have surface gas passages which are smaller than an average size of the particles of the second granular material (coarse material) but larger than an average size of the particles of the first granular material (fine catalyst).

In a preferred embodiment, the annular layer or each annular layer of second granular material has a constant radial thickness.

Preferably, the mass of the second granular material is not greater than 20%, even more preferably not greater than 10%, of the mass of the first granular material.

In some embodiments of the invention, the reactor comprises at least a further gas-permeable separation wall which defines a separating surface between a layer of the first granular material and a layer of the second granular material.

Said wall is preferably close to one of the collectors.

More advantageously the reactor comprises two gas-permeable separation walls located close to the outer collector and to the inner collector, respectively. A first gas-permeable separation wall is close to the outer collector and separates a layer of the first granular material from an outer coaxial layer of the second granular material. A second gas-permeable separation wall is close to the inner collector and separates said layer of first granular material from an inner coaxial layer of the second granular material.

Said at least one further separation wall may be a permanent item or temporary (non-permanent) item according to different embodiments of the invention.

A permanent separation wall is designed for permanent operation inside the catalytic bed. Therefore, a permanent wall is adapted to withstand the conditions (including e.g. temperature, pressure, chemical aggression) inside the catalytic bed. For example, in an ammonia reactor, a permanent wall is made preferably of alloyed steel or a nickel-chromium alloy.

It should be noted that said permanent separation wall does not have a load-bearing function. As the separation wall is immersed and substantially floating in the granular material (e.g. catalyst mass), the radial force and vertical force transmitted by the coarse granular material and fine granular material counterbalance each other. The separation wall is not required to withstand high loads and, therefore, can be in the form of a thin wall or in the form of a suitably close-knit mesh.

A temporary separation wall is a wall which:
can be disassembled from the respective collector, or
is made of a material which degrades or dissolves inside the catalytic bed, during operation of the bed itself.

A temporary separation wall, intended to degrade or dissolve during operation of the catalytic bed, can be made for example of a conventional carbon steel or alternatively of a textile material, a glass fibre or a mesh. A temporary separation wall shall be made of a suitable material which, during degradation or dissolution, does not release substances which are poisonous for the catalyst. In catalytic beds for the synthesis of ammonia, for example, a non-plastic material is preferred.

The above mentioned separation wall or walls facilitate the catalyst loading operations.

During operation of the bed, the fine catalyst is retained and bounded by the coarser granular material around and, therefore, a physical separation wall between the coarse granular material and the fine catalyst is not required. This makes it possible to use a temporary separation wall made of an inexpensive material. Moreover, the volume not available to the catalyst is minimized.

A permanent separation wall is generally more costly and more bulky, but has the advantage of further improving separation between the granular materials having different particle size, and is reusable when the catalyst is changed.

Said at least one separation wall shall be impermeable at least to the second (coarse) granular material catalyst. Said at least one separation wall is not required, on the other hand, to be impermeable to the fine catalyst. For example, in an embodiment of the invention, the at least one separation wall includes a mesh, and the mesh is sized to be impermeable only to the second granular material, but not to the fine catalyst. A finer mesh impermeable to the fine catalyst may also be adopted, but is not necessary. A relatively large mesh (i.e. not impermeable to the fine catalyst) reduces the cost of the separation walls and reduced the pressure loss caused by the separation wall itself.

The catalyst loading sequence advantageously includes: a first step of loading the coarse granular material next to the collectors, then a second step of loading the fine catalyst. The amount of the coarse granular material is preferably much smaller than the amount of the fine catalyst. As stated above, also the coarse granular material may be a catalyst (coarse catalyst). If necessary, special measures may be adopted to load the coarse granular material into the interspace between a collector and a separation wall. The fine catalyst can be loaded using conventional methods (e.g. sprinkler systems).

The layer of coarse granular material adjacent to the gas-permeable wall, or to each of the gas-permeable walls, has a radial thickness preferably ranging from 20 mm to 100 mm.

Another aspect of the invention is a method for loading a catalyst inside a catalytic bed according to the attached claims.

In an embodiment, the method includes loading a granular material, which may be inert or a catalyst, into a first region and into a second region of the volume available between two coaxial collectors. The first region is annular and adjacent to the outer collector; the second region is essentially annular around the inner collector. The method also includes loading a fine catalyst, which is finer than said granular material, into the remaining region of said volume, between the regions loaded with the granular material. Preferably the granular material is loaded first and the fine catalyst is loaded subsequently.

An embodiment of the invention includes a method for loading catalyst inside a catalytic bed of a chemical reactor, wherein a volume available to the catalyst is bounded by an outer collector and an inner collector, wherein the outer collector and the inner collector are coaxial and concentric gas-permeable cylindrical walls, the method comprising the steps of:

forming a first annular layer of a granular material adjacent to the outer collector;

forming a second annular layer of said granular material disposed around the inner collector;

forming an annular layer of said catalyst between said first layer and second layer of granular material;

wherein said granular material has a particle size larger than the catalyst.

A preferred embodiment is a method comprising the steps of:

providing a first gas-permeable separation wall arranged to delimit an annular interspace between said separation wall and one of said outer collector and inner collector, and forming said first layer or second layer of granular material into said interspace.

A more preferred embodiment is a method comprising the steps of:

providing a first gas-permeable separation wall arranged to delimit a first interspace between the outer collector and said first wall, providing a second gas-permeable separation wall arranged to delimit a second interspace between the inner collector and said second wall, forming said first layer of granular material into said first interspace, and forming said second layer of granular material into said second interspace, forming said layer of catalyst into an interspace delimited between said first separation wall and second separation wall.

In an embodiment, the at least one layer of the granular material is formed by loading the granular material by means of containers fixed to said outer collector or inner collector, said containers being made of a material adapted to dissolve in the catalytic bed under working conditions.

Said containers should dissolve in the chemical-physical conditions of the catalytic bed during operation, over a suitable time period and without releasing substances such as to damage the catalyst itself.

In a preferred embodiment, said containers are made of a textile material, preferably in the form of bags or stockings of textile material.

In a preferred embodiment, said granular material is also a catalyst.

The invention uses a fine catalyst while maintaining a layer of an inert or catalyst with larger particle size in contact with the collectors. The main advantage is that most of the catalytic bed is formed by the fine catalyst, which is advantageous for the process, but the collectors can be realized with the known technology for retention of a coarse granular material. In other words, the invention allows using a substantial amount of fine catalyst without an expensive re-design of the collectors.

The coarse material acts as a confining element for the fine catalyst. It has to be considered that a migration of the fine catalyst through the interstices of the coarse material is still possible, depending on the relative size of particles. Said migration may be promoted by the difference between the particle sizes of the two granular materials, i.e. the greater the difference, the more likely the migration. The migration may also be promoted, to some extent, by the flow passing through the bed. For example, in an inward-flow bed a migration of the fine catalyst is more likely to happen towards the inner collector.

Said migration of fine catalyst through the coarse material may form a transition layer at the interface between layers of catalyst; the thickness of said transition layer depends on parameters such as the difference between the particle size, the physical characteristics of the gas (e.g. density) and the motion conditions (direction, speed, etc.).

The radial thickness of the coarse layers will be selected according to the expected thickness of the transition layer, in order to avoid or minimize the possibility of the fine catalyst to reach one of the collectors, where it may escape the bed. The thickness of a coarse layer may also be selected to allow a uniform distribution of the gas. Therefore, the suitable thickness of a coarse layer will be selected taking into account parameters such as: difference between particle sizes, speed and density of the gaseous flow, any degree of migration considered acceptable.

For the ammonia synthesis catalyst, considering a fine catalyst particle size of up to 0.5 mm and a conventional coarse catalyst particle size of 1.5-3 mm for the coarse catalyst, a thickness from 20 mm to 100 mm of the coarse catalyst layers is generally suitable for effectively containing the fine catalyst, substantially avoiding migration. If necessary, a thickness of more than 100 mm may be adopted also taking into account the size of the reactor.

The advantages of the invention will emerge even more clearly with the aid of the detailed description below relating to some preferred embodiments.

DETAILED DESCRIPTION OF A PREFERRED EMBODIMENT

Figures 1, 2:
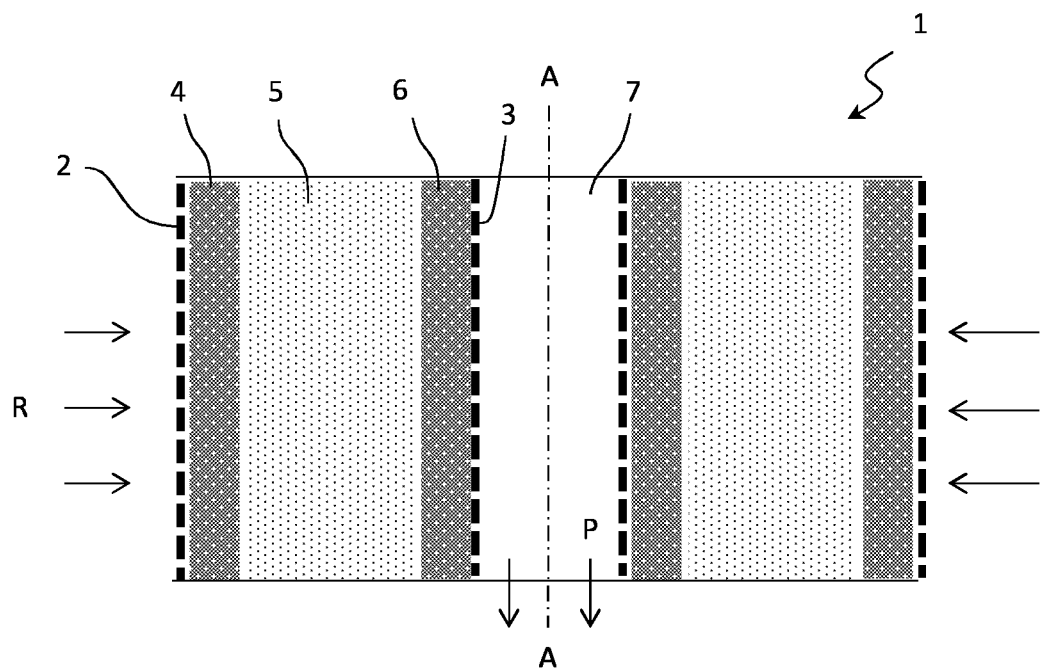
FIG. 1 shows a schematic cross-sectional view of a catalytic bed of a chemical reactor according to an embodiment of the invention.
FIG. 2 shows a schematic sectional view of a catalytic bed in another embodiment of the invention.

FIG. 1 shows in schematic form a cross-sectional view of a catalytic bed 1 comprising an outer collector (distributor)

2 and an inner collector 3. The catalytic bed 1 is provided inside a chemical reactor as illustrated e.g. in FIG. 4.

The catalytic bed 1 has a substantial radial symmetry about an axis A.

The distributor 2 and the collector 3 comprise, or are formed by, coaxial cylindrical walls which are gas-permeable as a result of holes or openings. The collectors 2 and 3 may, in some embodiments, have a modular structure formed by panels.

The catalytic bed 1 comprises an outer layer 4 and inner layer 6 of a coarse catalyst adjacent to the distributor 2 and to the collector 3, respectively, and also comprises a layer 5 of a fine catalyst.

The catalyst of the layers 4, 6 and of the layer 5 is of the same kind, but have a different particle size, the layer 5 having a finer particle size. For example, the catalyst of layers 4, 5 and 6 is a catalyst for the synthesis of ammonia from a gas containing hydrogen and nitrogen in a suitable ratio equal to or close to 3:1.

The layers of catalyst 4, 5 and 6 are coaxial and concentric. The layer 5 of fine catalyst forms the central portion of the catalytic bed 1; the layers 4 and 6 of coarse catalyst form two peripheral annular regions of the catalytic bed 1 around the fine layer 5 and in contact with the collectors 2 and 3.

The fine catalyst of the layer 5 is therefore bounded and retained by two surrounding layers 4, 6 of the coarse catalyst. The collectors 2 and 3 are in contact solely with the coarse catalyst of the layers 4 and 6.

During use, a mixture of gaseous reagents R passes through the bed 1 with a radial flow or mixed axial-radial flow, entering the bed via the outer collector 2 and crossing the bed in an essentially centripetal (inward) direction. The outer collector 2, therefore, is also termed distributor.

The reaction products P pass through the inner collector 3 and are collected in a central tube 7 bounded by said inner collector 3.

The radial thickness of the catalyst layers 4 and 6 may be determined taking into account the following: a choice of thin layers 4 and 6 increase the available volume for the layer 5 of fine catalyst, which is more efficient for the purposes of the process; a choice of thicker layers 4 and 6, however, gives a better separation between the two types of catalyst and reduces the risk of migration of the fine catalyst through the interstices of the coarse catalyst. Moreover, thicker layers are easier to form when loading the catalyst. The optimum thickness of the layers 4 and 6 will be chosen based on a compromise between these requirements.

FIG. 2 shows an embodiment comprising gas-permeable walls separating the layers of coarse and fine catalyst. The figure shows in particular: a first separation wall 8 which separates the layer 5 of fine catalyst from the outer layer 4 of coarse catalyst; a second separation wall 9 which separates the layer 5 of fine catalyst from the inner layer 6 of coarse catalyst.

The first separation wall 8 is close to the outer collector 2 and the second separation wall 9 is close to the inner collector 3. Said separation walls 8 and 9 may be connected, in a fixed or releasable manner, to the respective collector 2 and 3.

Said separation walls 8 and 9 may be permanent or non-permanent (temporary). Non-permanent walls serve solely as an aid for loading the catalyst and are made of a material which degrades or dissolves in a controlled manner during operation of the reactor. Permanent walls are made of a material which is able to withstand the operating conditions of the catalytic bed such as temperature or pressure.

Some aspects relating to the construction of the first separation wall 8 are illustrated below.

It should be noted that said first separation wall 8 must follow a concave surface, that is the inner surface of the collector 2. Moreover it should be noted that the coarse catalyst, during loading, pushes towards the centre of the bed and tends to detach the first separation wall 8 from the collector 2.

For these reasons the first separation wall 8 is significantly stressed. A preferred mode of construction of said wall 8 consists of perforated sheet metal with holes or slots or expanded sheet metal.

An advantageous geometry includes a first separation wall 8 made of small-thickness corrugated metal sheets. Perforated corrugated metal sheets are bolted with suitable spacing to metal sheets forming the collector 2. An example of assembly procedure essentially involves: mounting the collector 2 inside the reactor; positioning and bolting the corrugated metal sheets to the collector 2. This results in the creation of essentially trapezoidal interspaces between the corrugated metal sheets and the collector 2. The base of these interspaces is closed for example by a ring on which the corrugated metal sheets also rest. The catalyst is poured into said interspaces from above, forming the layer 4.

The top ends of said corrugated metal sheets may have inclined flanges (similar to a funnel) to facilitate the catalyst loading operations.

Some aspects regarding the construction of the second separation wall 9 are now described.

The construction of the second separation wall 9 is generally simpler than that of the first separation wall 8. The second separation wall 9 follows a convex surface instead of a concave surface, being located on the outside of the collector 3; the surface is therefore smaller; in the frequent case of an inward reactor, the flow tends to push the catalyst towards the wall, instead of moving it away. In principle, the solutions described further above for the first separation wall 8 may be used also for the second separation wall 9.

If migration of the fine catalyst towards the outlet collector 3 is expected, or in case the very small dimensions of said collector 3 do not allow the same construction as the first separation wall 8, the second separation wall 9 may be formed by means of a close-knit mesh. Said mesh is kept at a uniform distance from the collector 3 by means of a frame. After positioning the mesh on the frame so as to form a tubular element, the coarse catalyst can be loaded.

In order to prevent the migration of the fine catalyst towards the collector 3, said separation mesh must be made of a material resistant to the operating conditions (e.g. inconel). In this way a permanent separation is provided, which allows to minimize the radial thickness of the catalyst layer 6. If, on the other hand, a non-permanent separation is used, a thicker layer of catalyst is necessary, depending on the expected thickness of the transition layer. After the loading of the fine catalyst, the mesh is floating in the catalytic mass, with the radial and vertical thrusts balanced by the two volumes of catalyst surrounding it. Also in this case, the layer of coarse catalyst may be created by pouring the catalyst into bags or stockings resting on the inner collector 3.

Figure 3:
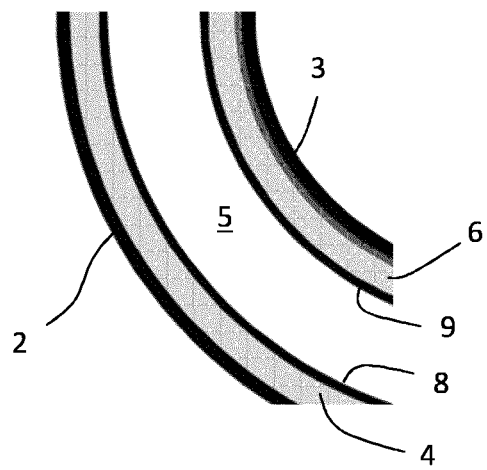
FIG. 3 illustrates a cross section of the catalytic bed of FIG. 2.

FIG. 3 illustrates the layers 4, 5, 6 of catalyst, the collectors 2, 3 and the separation walls 8, 9 in a cross section according to a plane perpendicular to the axis A.

Figure 4:
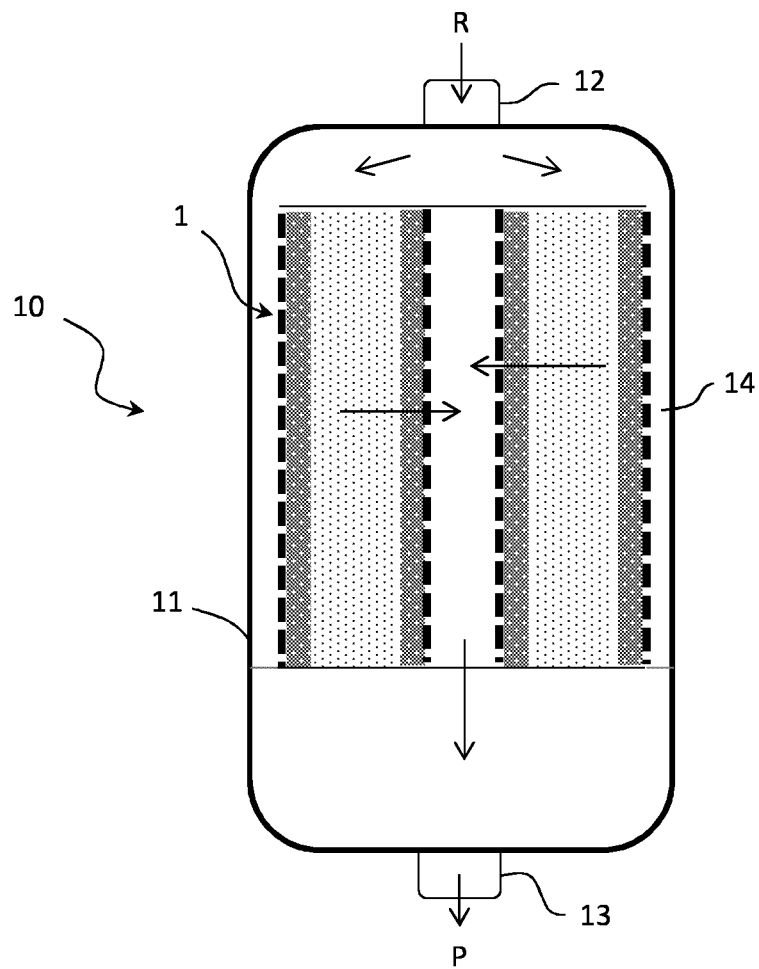
FIG. 4 illustrates a reactor according to an embodiment of the invention.

FIG. 4 illustrates a reactor 10 according to an embodiment the invention. The reactor 10 has a pressure vessel 11 which contains the catalytic bed 1. The reactor 10 has an inlet 12 for the reagents R and an outlet 13 for the reaction products P.

The arrows of FIG. 4 illustrate the gaseous flow inside the reactor 10 and through the catalytic bed 1. The reagents 10, from the top of reactor 10, are directed into the annular space 14 around the catalytic bed 1 and, from here, enter the bed 1 with an inward axial flow. The products P leaving the bed 1 are collected in the tube 7 and, from here, in the lower part of the reactor 10, where they leave the reactor via the outlet 13.

The invention achieves the aforementioned objects, allowing a fine catalyst to be used in combination with collectors 2 and 3 made according to the known technology suitable for the retention of a coarse catalyst.

The invention claimed is:

1. A catalytic reactor, comprising:
   a catalytic bed suitable for a chemical reaction of conversion of a gaseous charge into a gaseous product, said catalytic bed having an annular-cylindrical geometry, said catalytic bed including at least one collector made with a gas-permeable cylindrical wall; and
   an outer collector and an inner collector;
   wherein said at least one collector includes at least one annular layer of a first granular material that includes a catalyst adapted to catalyse said reaction of conversion, and at least one annular layer of a second granular material;
   wherein the second granular material is coarser than the first granular material, the second granular material having a larger particle size than the first granular material;
   wherein said at least one collector includes an outlet collector and said layer of second granular material is adjacent to and in contact with said outlet collector, so that said layer of first granular material is separated from the collector by the layer of second granular material;
   wherein said outer collector and said inner collector are cylindrical, coaxial, and gas-permeable;
   wherein said outer collector and said inner collector include two annular layers of said second granular material;
   wherein a first layer of said second granular material is in contact with the outer collector and a second layer of said second granular material is in contact with the inner collector;
   wherein the layer of the first granular material is a central layer located between said first layer and said second layer of the second granular material.

2. The catalytic reactor according to claim 1, wherein said outlet collector is an inner collector.

3. The catalytic reactor according to claim 1, wherein one of said outer collector or said inner collector operates as distributor of a gaseous flow of reagents entering the catalytic bed, and the other of said outer collector or said inner collector collects a gaseous flow of reaction products exiting the catalytic bed.

4. The catalytic reactor according to claim 1, wherein the second granular material includes a catalyst adapted to catalyse said reaction of conversion.

5. The catalytic reactor according to claim 4, wherein the first granular material and the second granular material include catalysts of the same composition and differ only by the particle size.

6. The catalytic reactor according to claim 1, wherein an average size of the particles of the first granular material is 10% to 80% of the average size of the particles of the second material.

7. The catalytic reactor according to claim 1, wherein the second granular material has a particle size from 1.5 mm to 3 mm.

8. The catalytic reactor according to claim 7, wherein the particle size is from 2 mm to 3 mm.

9. The catalytic reactor according to claim 1, wherein the first granular material has a particle size from 0.5 mm to 2 mm.

10. The catalytic reactor according to claim 9, wherein the particle size is from 0.5 mm to 1.5 mm.

11. The catalytic reactor according to claim 1, further comprising at least one additional gas-permeable wall that defines a separation surface between a layer of the first granular material and a layer of the second granular material.

12. The catalytic reactor according to claim 11, wherein said at least one additional gas-permeable wall is impermeable to the second granular material.

13. The catalytic reactor according to claim 11, further comprising:
    an outer collector and an inner collector;
    wherein said outer and inner collectors are cylindrical, coaxial, and gas-permeable;
    wherein said outer and inner collectors including two annular layers of said second granular material;
    wherein a first layer of said second granular material is in contact with the outer collector and a second layer of said second granular material is in contact with the inner collector;
    wherein the layer of the first granular material is a central layer located between said first layer and second layer of the second granular material;
    an outer gas-permeable separation wall close to the outer collector and an inner gas-permeable separation wall close to the inner collector;
    wherein the first layer of said second granular material is located between said outer separation wall and said outer collector;
    wherein the second layer of said second granular material is located between said inner separation wall and said inner collector; and
    a layer of said first granular material between said outer separation wall and inner separation wall.

14. The catalytic reactor according to claim 1 wherein the outer collector and the inner collector have surface gas passages which are smaller than an average size of the particles of the second granular material, but larger than an average size of the particles of the first granular material.

15. The catalytic reactor according to claim 1, wherein the annular layer or each annular layer of second granular material has a constant radial thickness.

16. The catalytic reactor according to claim 1, wherein the mass of the second granular material is not greater than 20% of the mass of the first granular material.

17. The catalytic reactor according to claim 1, wherein the first granular material and the second granular material include catalysts suitable for the synthesis of ammonia from a make-up gas containing hydrogen and nitrogen.

18. A method for loading a fine catalyst inside a catalytic bed of a chemical reactor, wherein a volume available to the fine catalyst is bounded by an outer collector and an inner collector, wherein the outer collector and the inner collector are coaxial and concentric gas-permeable cylindrical walls, the method comprising:

forming a first annular layer of a granular material adjacent to the outer collector, forming a second annular layer of said granular material disposed around the inner collector;

forming an annular layer of said fine catalyst between said first layer and second layer of granular material, wherein said granular material having a particle size larger than the fine catalyst.

19. The method according to claim 18, further comprising:

providing a first gas-permeable separation wall arranged to delimit an annular interspace between said separation wall and one of said outer collector and inner collector; and forming said first layer or second layer of granular material into said annular interspace.

20. The method according to claim 19, further comprising:

providing a first gas-permeable separation wall arranged to delimit a first interspace between the outer collector and said first wall;

providing a second gas-permeable separation wall arranged to delimit a second interspace between the inner collector and said second wall;

forming said first layer of granular material into said first interspace;

forming said second layer of granular material into said second interspace; and forming said layer of catalyst into an interspace delimited between said first separation wall and second separation wall.

21. The method according to claim 18, wherein at least one layer of the granular material is formed by loading the granular material by containers fixed to said outer collector or said inner collector, said containers being made of a material adapted to dissolve in the catalytic bed under working conditions.

22. The method according to claim 21, wherein said containers are made of a textile material.

23. The method according to claim 18, said granular material being also a catalyst.

24. The cataltytic catalytic reactor according to claim 1, further comprising a gas-permeable permanent separation wall that defines a separating surface between the layer of the first granular material and the layer of the second granular material, wherein the gas-permeable permanent separation wall is designed for permanent operation and adapted to withstand conditions inside the catalytic bed.

25. The catalytic reactor according to claim 1, further comprising a gas-permeable temporary or non-permanent separation wall that defines a separating surface between the layer of the first granular material and the layer of the second granular material, wherein said gas-permeable temporary or non-permanent separation wall is capable of being disassembled or is made of a material that degrades or dissolves inside the catalytic bed during operation of the catalytic bed.

26. The method according to claim 22, wherein the textile material of the containers includes at least one of bags or stockings of textile material.

* * * * *